United States Patent
Cariou et al.

(10) Patent No.: US 10,659,540 B2
(45) Date of Patent: May 19, 2020

(54) [5G NEXT GENERATION WI-FI] ON THE FLY TRAFFIC STEERING FOR COLLOCATED MULTI-BAND AGGREGATION

(71) Applicant: INTEL IP CORPORATION, Santa Clara, CA (US)

(72) Inventors: Laurent Cariou, Portland, OR (US); Yaron Alpert, Petah Tikva (IL); Bahareh Sadeghi, Portland, OR (US); Robert Stacey, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 173 days.

(21) Appl. No.: 15/470,390

(22) Filed: Mar. 27, 2017

(65) Prior Publication Data

US 2018/0278697 A1    Sep. 27, 2018

(51) Int. Cl.
| | | |
|---|---|---|
| H04L 29/08 | (2006.01) | |
| H04L 12/24 | (2006.01) | |
| H04L 12/773 | (2013.01) | |
| H04L 27/26 | (2006.01) | |
| H04L 1/00 | (2006.01) | |
| H04W 52/50 | (2009.01) | |
| H04W 74/08 | (2009.01) | |
| H04Q 11/04 | (2006.01) | |
| H04J 11/00 | (2006.01) | |
| H04L 5/00 | (2006.01) | |
| H04L 1/16 | (2006.01) | |

(Continued)

(52) U.S. Cl.
CPC .......... *H04L 67/16* (2013.01); *H04J 11/0053* (2013.01); *H04L 1/0028* (2013.01); *H04L 1/1621* (2013.01); *H04L 1/1874* (2013.01); *H04L 5/001* (2013.01); *H04L 27/2602* (2013.01); *H04L 41/0246* (2013.01); *H04L 45/60* (2013.01); *H04L 67/147* (2013.01); *H04Q 11/00* (2013.01); *H04Q 11/0428* (2013.01); *H04W 52/50* (2013.01); *H04W 74/0816* (2013.01); *H04L 63/20* (2013.01); *H04W 74/0808* (2013.01); *H04W 84/12* (2013.01); *H04W 88/06* (2013.01); *H04W 88/10* (2013.01)

(58) Field of Classification Search
None
See application file for complete search history.

(56) References Cited

U.S. PATENT DOCUMENTS

| | | | | |
|---|---|---|---|---|
| 2008/0137601 A1* | 6/2008 | Sung | .................. | H04W 28/065 370/329 |
| 2011/0134894 A1* | 6/2011 | Stacey | .................. | H04L 69/14 370/338 |

(Continued)

*Primary Examiner* — Adnan Baig
(74) *Attorney, Agent, or Firm* — Jason H. Vick; Sheridan Ross, PC

(57) ABSTRACT

Simultaneous dual band operation (2.4 and 5 GHz) is common in APs on the market today, and tri-band devices are expected in the market soon. Link aggregation can also be applicable to multiple air interfaces in the same band (for instance 2 independent IEEE 802.11ac/ax air interfaces at 5 GHz on 2 different 80 MHz channels). One exemplary aspect provides technology that enables significantly higher throughput and/or higher reliability for two stations (STAs) or a STA and the access point (AP) when the devices support simultaneous multi-band operation.

20 Claims, 6 Drawing Sheets

(51) Int. Cl.
  *H04Q 11/00* (2006.01)
  *H04L 1/18* (2006.01)
  *H04W 84/12* (2009.01)
  *H04W 88/10* (2009.01)
  *H04L 29/06* (2006.01)
  *H04W 88/06* (2009.01)

(56) References Cited

U.S. PATENT DOCUMENTS

2014/0010186 A1\* 1/2014 Cordeiro ............... H04W 28/16
  370/329
2015/0103663 A1\* 4/2015 Amini ............... H04W 28/0215
  370/235

\* cited by examiner

[5G NEXT GENERATION WI-FI] ON THE FLY TRAFFIC STEERING FOR COLLOCATED MULTI-BAND AGGREGATION

TECHNICAL FIELD

An exemplary aspect is directed toward communications systems. More specifically an exemplary aspect is directed toward wireless communications systems and even more specifically to next generation wireless networks. Even more particularly, an exemplary aspect is directed toward traffic steering in wireless networks.

BACKGROUND

For example, but not by way of limitation, common and widely adopted techniques used for communication are those that adhere to the Institute for Electronic and Electrical Engineers (IEEE) 802.11 standards such as the IEEE 802.11n standard, the IEEE 802.11ac standard and the IEEE 802.11ax standard.

The IEEE 802.11 standards specify a common Medium Access Control (MAC) Layer which provides a variety of functions that support the operation of IEEE 802.11-based Wireless LANs (WLANs) and devices. The MAC Layer manages and maintains communications between IEEE 802.11 stations (such as between radio network interface cards (NIC) in a PC or other wireless device(s) or stations (STA) and access points (APs)) by coordinating access to a shared radio channel and utilizing protocols that enhance communications over a wireless medium.

IEEE 802.11ax is the successor to IEEE 802.11ac and is proposed to increase the efficiency of WLAN networks, especially in high density areas like public hotspots and other dense traffic areas. IEEE 802.11ax also uses orthogonal frequency-division multiple access (OFDMA), and related to IEEE 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

IEEE 802.11ac and other standards have proposed full duplex WiFi radios that can simultaneously transmit and receive on the same channel using standard WiFi 802.11ac PHYs. These radios achieve close to the theoretical doubling of throughput in all practical deployment scenarios. The IEEE 802.11ac-2013 update, or IEEE 802.11ac Wave 2, is an addendum to the original IEEE 802.11ac wireless specification. IEEE 802.11ac Wave 2 utilizes MU-MIMO (Multi-User-Multi-Input Multi-Output) technology and other advancements to help increase theoretical maximum wireless speeds from 3.47 Gbps to 6.93 Gbps in IEEE 802.11ac Wave 2.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

For next generation WiFi or for, for example, IEEE 802.11ax Wave 2, a very compelling technical improvement can be realized depending on how link aggregation between different WiFi air interfaces on different bands is managed (e.g., 2.4 GHz, 5 GHz, 60 GHz, and others).

Simultaneous dual band operation (2.4 and 5 GHz) is common in APs on the market today, and tri-band devices are expected in the market soon. Link aggregation can also be applicable to multiple air interfaces in the same band (for instance 2 independent IEEE 802.11ac/ax air interfaces at 5 GHz on 2 different 80 MHz channels).

One exemplary aspect provides technology that enables significantly higher throughput and/or higher reliability for two stations (STAs) or a STA and an access point (AP) when the devices support simultaneous multi-band operations.

One example of link aggregation at the MAC (Media Access Control) layer (and/or above the MAC layer), is enabled by establishing multiple links between 2 peer STAs or wireless devices on different bands with different air interfaces, which operate independently from the others. These multiple links can be aggregated, for instance, in a multi-band upper MAC defined in each of the peer STAs. As one example, Fast Session Transfer (FST) defined in IEEE 802.11ad can serve as a baseline framework for this link aggregation.

The aggregation enables, as an example:

The distribution of a traffic flow on multiple bands/air interfaces in order to sum the throughputs from the different air interfaces, and Allows directing of a specific traffic type on the best air interface (highest throughput interface, most reliable interface, and/or lower latency interface, etc.).

This aggregation can also be performed transparently to the upper layers of the device(s), in which case a single MAC SAP (Service Access Point) can be exposed to the upper layers. This aggregation may also occur on higher layer(s).

A Service Access Point or SAP is a term used to describe a network endpoint(s) in an Open Systems Interconnection (OSI) networking environment. A SAP is a theoretical location where a first OSI layer can request the services of another OSI layer(s).

A practical example is PD-SAP or PLME-SAP in IEEE 802.15.4. These SAPs are constructed where the Media Access Control (MAC) layer requests services from a physical layer (PHY).

Figure 1:
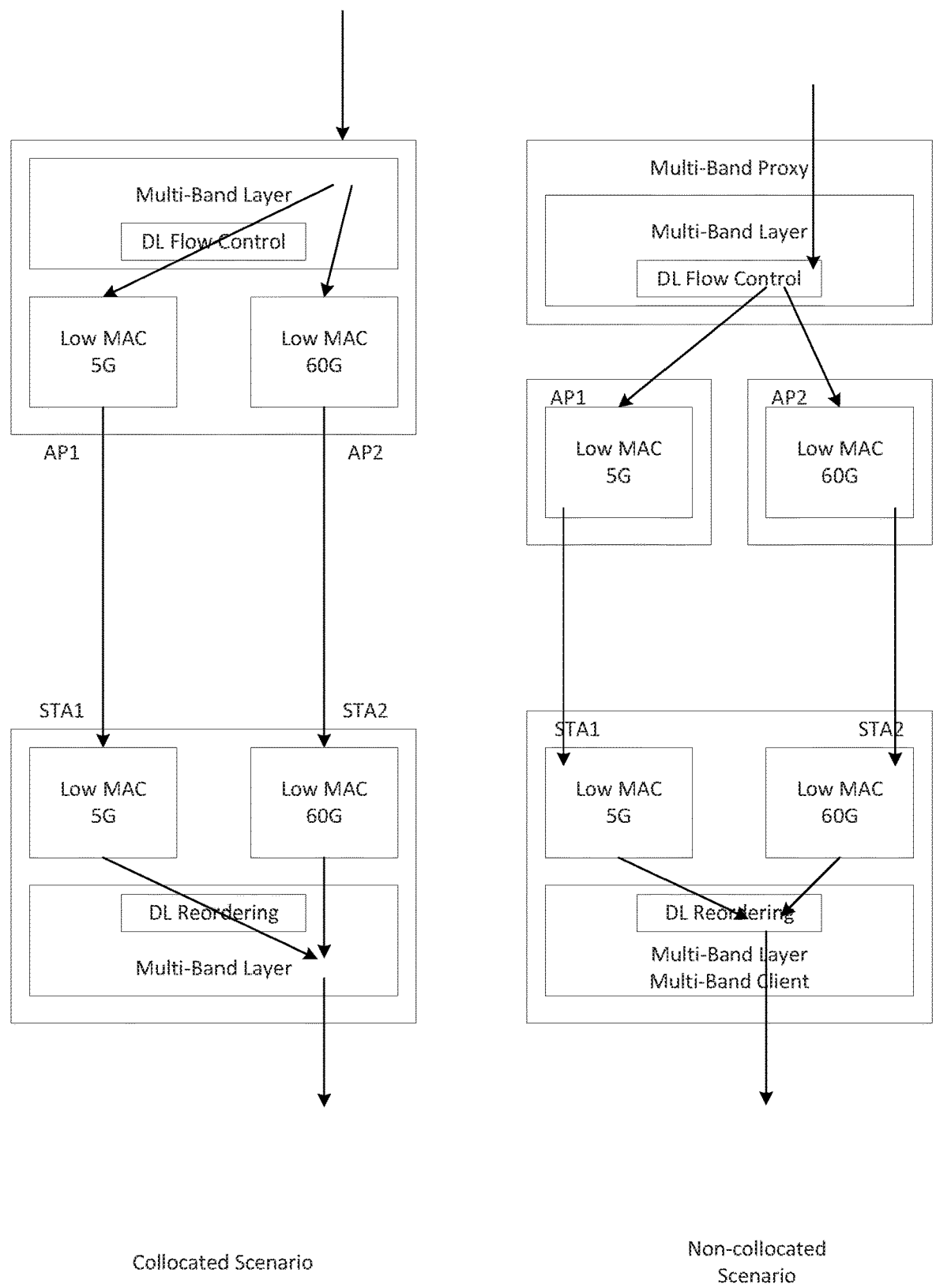
FIG. 1 illustrates exemplary collocated and non-collocated scenarios.

One approach to improving a non-collocated environment is to enable link aggregation of non-collocated air interfaces, operating independently, between 2 peer stations. With this architecture, a multi-band upper-MAC layer is provided at both peer stations (e.g., on the client side and on the infrastructure side (AP) side). On the infrastructure side, this multi-band upper-layer, also known as a multi-band proxy, can be collocated or non-collated with one or multiple APs. As one example, the multi-band proxy can be collocated with one AP (e.g., an anchor AP), and two links are aggregated, one with the anchor AP and one with another AP, which can be referred to as the booster AP. The links between the client and the two APs (anchor and booster) can be aggregated. (See FIG. 1 for examples of collocated and non-collocated scenarios.)

As for flow control, one approach handles flow control (traffic steering decisions) in the multi-band proxy for downlink (DL) traffic and in the multi-band client for uplink (UL) traffic. This flow control can include deciding how traffic coming from the upper layers will be split into two or more data flows, each of the data flows then being forwarded to a specific air interface.

This approach can utilize buffering of packets in the multi-band proxy with an assigned multi-band sequence number that are steered to the different APs to be transmitted to the destination STA. The packets are then supressed from the buffers only when receiving a report from the AP that the packets have been successfully transmitted. Here, it is assumed that reordering is performed on the receiver side.

The reports also allow relevant information to be obtained such that good steering decisions can be made. The approach also allows lossless transitions in the event one link breaks.

Advancements to the flow control techniques discussed above can be further improved upon. For example, the system can be improved to at least address changes in throughput and/or latency on the different air interfaces. This can help overcome, for example, a reduction in performance of the aggregation.

While the techniques discussed herein will focus on a collocated scenario, the techniques are similarly applicable to non-collocated scenarios. In one exemplary collocated scenario, all the APs and the multi-band (MB) proxy are collocated in the same device. The fact that the APs and the multi-band proxy are collocated can further be capitalized upon in order to enhance and improve flow control decisions.

One aspect introduces an architecture for a multi-band device with a centralized (common multi-band entity) multi-band upper-MAC entity (which can be considered to correspond to the multi-band proxy in the non-collocated scenario) and multiple lower MAC entities (one for each WiFi air interface.)

All of the entities can optionally be collocated in the same multi-band device. The different transmission and reception functions can also optionally be reorganized between the per-band low MAC and the centralized upper MAC entities.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology-Telecommunications and information exchange between systems Local and metropolitan area networks-Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology-Telecommunications and Information Exchange Between Systems-Local and Metropolitan Area Networks-Specific Requirements-Part 11: Wireless LAN Medium Access Control (MAC) and Physical Layer (PHY) Specifications-Amendment 4: Enhancements for Very High Throughput for Operation in Bands below 6 GHz", December, 2013); IEEE 802.11ad ("IEEE P802.11ad-2012, IEEE Standard for Information Technology-Telecommunications and Information Exchange Between Systems-Local and Metropolitan Area Networks-Specific Requirements-Part 11: Wireless LAN Medium Access Control (MAC) and Physical Layer (PHY) Specifications-Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology-Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology-Telecommunications and Information Exchange Between Systems Local and Metropolitan Area Networks-Specific Requirements Part 11: Wireless LAN Medium Access Control (MAC) and Physical Layer (PHY) Specifications-Amendment: Enhanced Throughput for Operation in License-Exempt Bands Above 45 GHz)), IEEE 802.11-2016, and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2 G, 2.5 G, 3 G, 3.5 G, 4 G, Fifth Generation (5 G), or Sixth Generation (6G) mobile networks, 3 GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a WiFi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 5 GHz and/or 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

In an exemplary collocated scenario for a wireless device, and in accordance with exemplary transmitter operation, a centralized (common multi-band) entity can maintain and manage the transmission buffers for all operating bands instead of having per-band transmission buffers that are currently handled in the low MAC of each WiFi air interface. The centralized multi-band upper-MAC entity can be responsible for routing a specific MSDU (MAC Service Data Units) to a specific band lower MAC entity when the actual transmission occurs. Note that the centralized multi-band upper-MAC can present a single MAC SAP (Service Access Point) to the upper layers. In such a case, the upper layers are unaware of the actual path that the packet follows on WiFi to reach the STA.

Figure 2:
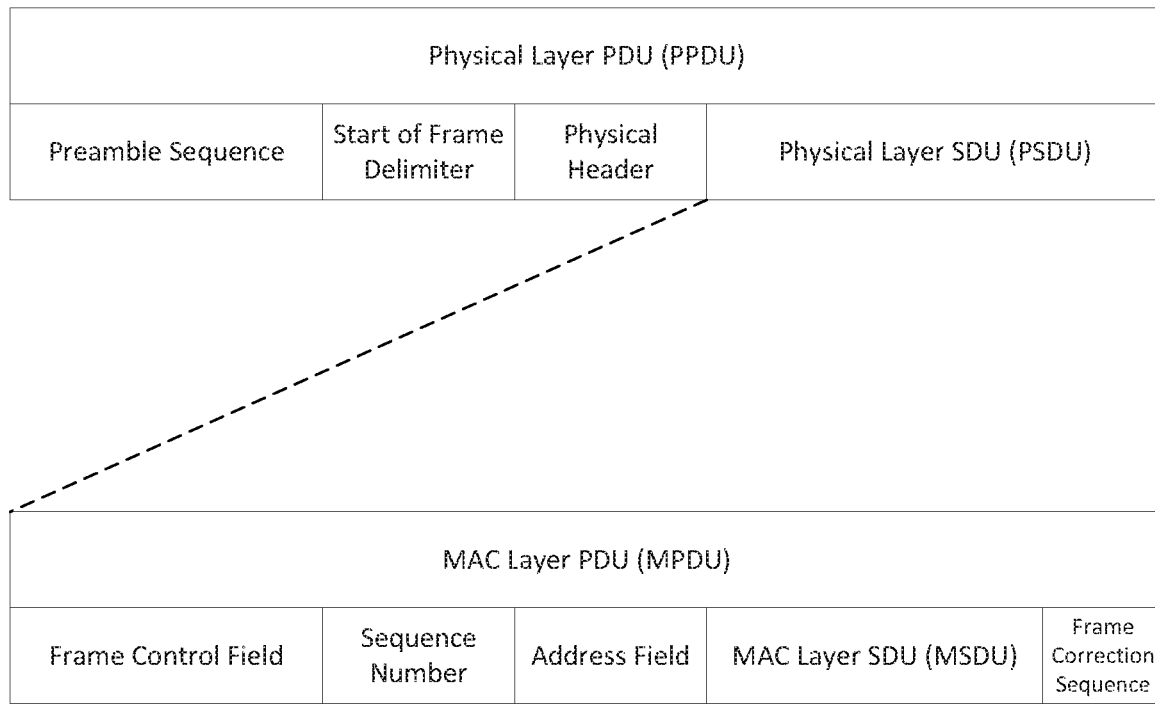
FIG. 2 illustrates an exemplary PPDU and MPDUs.

The MAC service data unit (MSDU) is a service data unit which can be received from a logical link control (LLC) sub-layer. In the protocol stack, this LLC sub-layer is typically above a media access control (MAC) sub-layer. LLC and MAC sub-layers can be collectively identified as a DLL (Data Link Layer). An example of a PPDU and MAC Layer PDU are shown in FIG. 2. While specific information and certain fields are shown, it should be appreciated that different information and/or different information can be used with the techniques disclosed herein.

One aspect has the multi-band packets in the multi-band upper MAC buffers steered/routed to the low MAC of one air interface based on air time availability (such as when the EDCA (Enhanced Distributed Channel Access) function of that interface indicates that the channel has been acquired by the device and that the packets will be able to be transmitted right away) and/or based on other routing criteria. These other routing criteria can include one or more of Quality of Service (QoS), priority, reliability, and/or the like.

One aspect simplifies the multi-band flow control/traffic routing/steering calculations as the packets are transmitted on the first available air interface.

In accordance with exemplary receiver operation, the centralized (common multi-band) entity can handle the multi-band reception (reordering) buffers, instead of being maintained in the low MAC of each WiFi air interface. This allows for specific packet(s)/MSDU to be transmitted on any available band and that block-ACKs can be transmitted across multiple air interfaces using a selected band.

Figure 3:
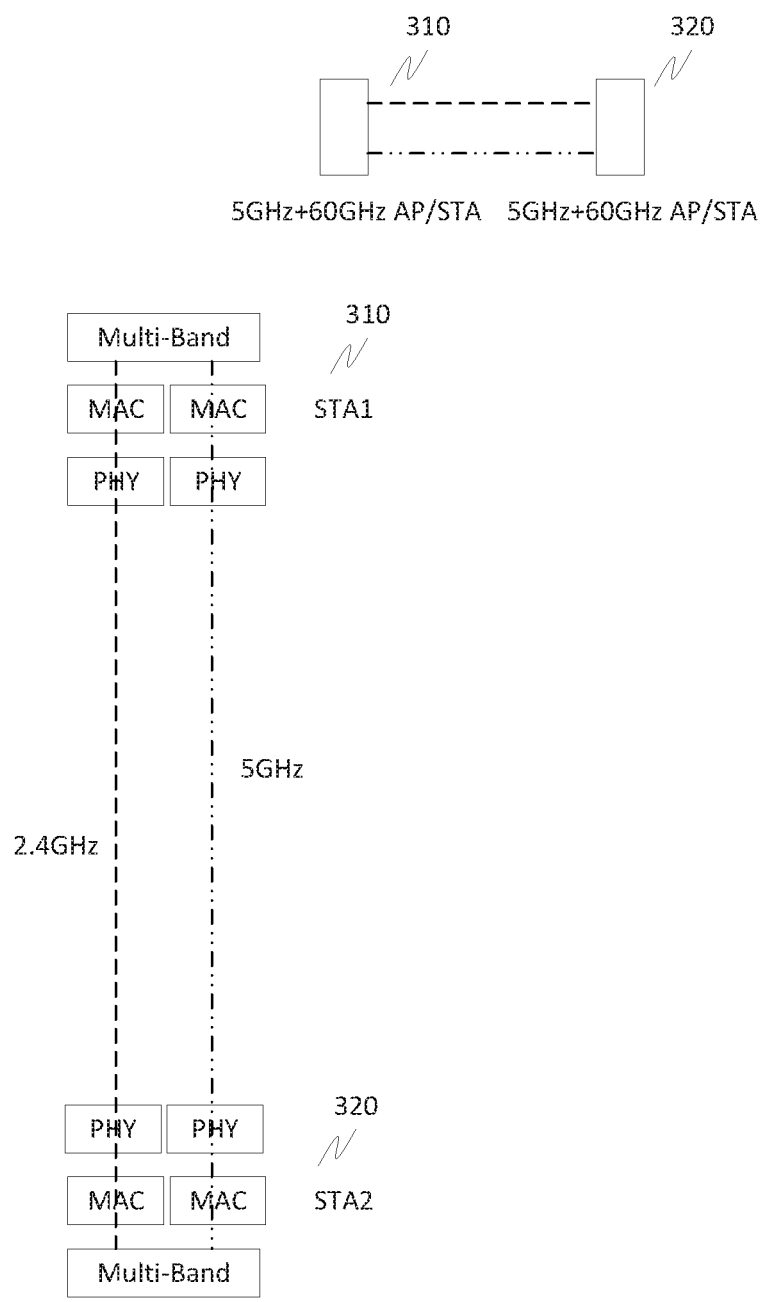
FIG. 3 illustrates a block diagram of components for performing the techniques disclosed herein.
Figure 4:
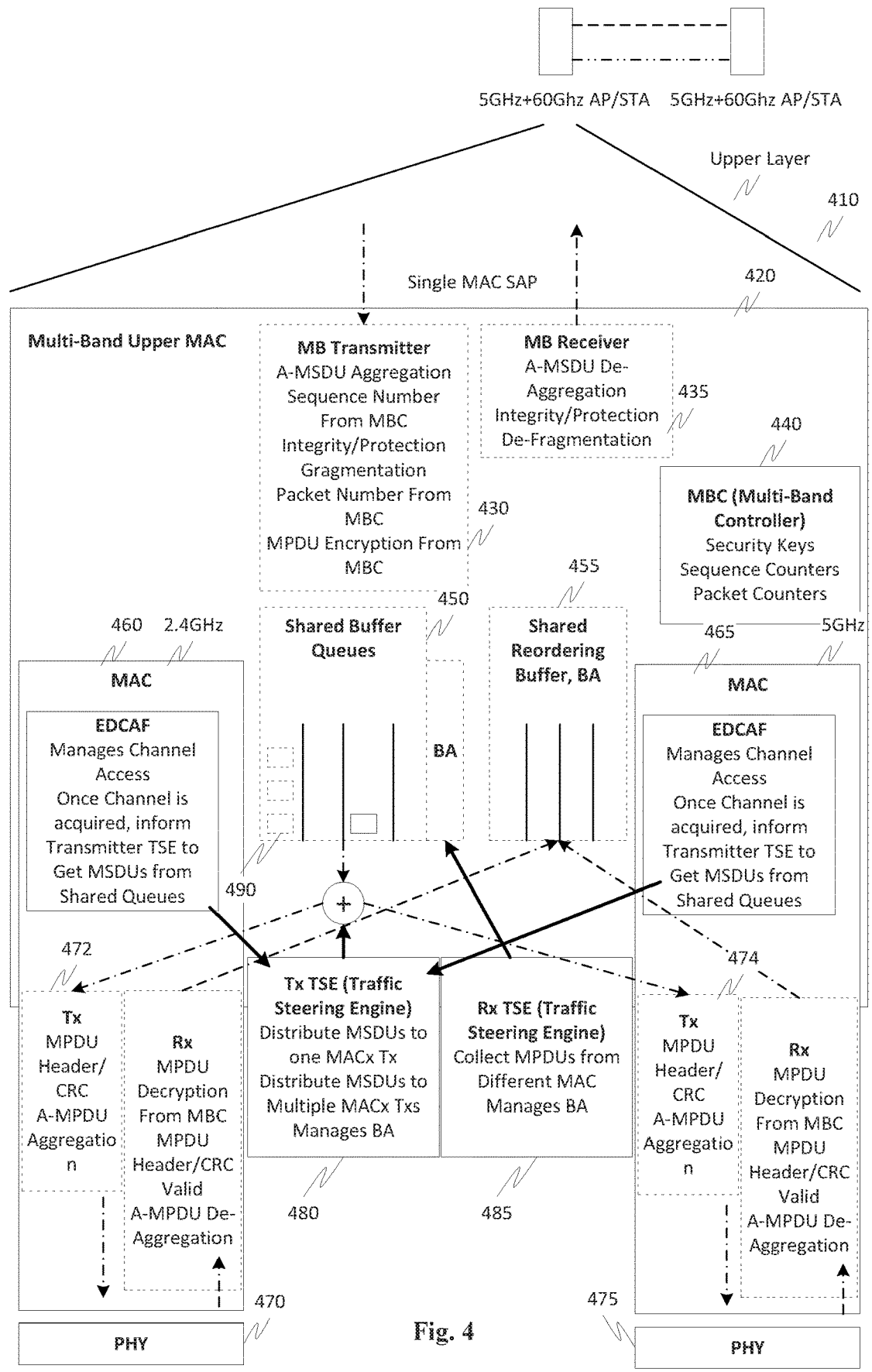
FIG. 4 illustrates a functional block diagram for enhanced traffic steering.

An exemplary architecture capable of implementing the above techniques is shown in FIGS. 3-4. In FIGS. 3-4, a proposed architecture is presented that is capable of performing traffic steering and on-the-fly traffic steering. In the Figures, dash-dot-dash represents the process at the transmitter (Tx) and dash-dash-dot represents the process at the receiver (Rx).

More specifically, FIG. 3 illustrates a high level overview of some of the components in two wireless devices 310/320. The wireless devices can be, for example, 5 GHz/60 GHz APs/STAs. Each wireless device includes a MAC and PHY for each air interface, e.g., the 5 GHz and 60 GHz interfaces, and a multi-band upper-MAC layer. FIG. 4 illustrates in greater detail the components in FIG. 3 and the interaction there between.

In FIG. 4 there is an upper layer 410 with, for example, a single MAC SAP, a multi-band upper MAC 420 that can be the traffic steering portion of the device, a multi-band transmitter 430, a multi-band receiver 435, shared buffer queues 450 and associated block-ACK services (BA), a shared reordering buffer 455, MAC 460 for the 2.4 GHz band, MAC 465 for the 5 GHz band, the PHY 470 for the 2.4 GHz band, the PHY 475 for the 5 GHz band, and the transmitter traffic steering engine (TSE) 480 and receiver traffic steering engine 485.

While the exemplary embodiment in FIG. 4 shows that the 2.4 GHz MAC 240 and 5 GHz MAC 465 may be located in the multi-band upper MAC 420, it is to be appreciated that the 2.4 GHz MAC 240 and 5 GHz MAC 465 could be located outside the multi-band upper MAC 420 or as partially overlapping with the multi-band upper MAC 420. Stated another way, the 2.4 GHz MAC 240 and 5 GHz MAC 465 could be associated, partially associated or not associated with the multi-band upper MAC 420 and could, for example, be completely separate or fully integrated into the multi-band upper MAC 420. Similarly, the transmitter traffic steering engine (TSE) 480 and receiver traffic steering engine 485 could each respectively be associated, partially associated or not associated with the multi-band upper MAC 420 and could, for example, be completely separate or fully integrated into the multi-band upper MAC 420.

Some of the exemplary advantages associated with this configuration are that traffic steering is very fast and dynamic, and could even be performed in the sub microsecond level. Additionally, ACKs can be sent from either the 2.4 GHz or 5 GHz interface, regardless of where the actual packet was received. Additionally, packets 490 can optionally be immediately transmitted on any available channel, thereby improving aggregation performance on-the-fly.

While the following description will be described in relation to a collocated device, the techniques disclosed herein can be extended to non-collocated devices such that the flow control mechanisms can be in a different device. For example, feedback from the attached devices can be used to direct traffic steering, with the only drawback being latency between the devices. For collocated devices, the traffic steering can be faster because the feedback is faster since the various mechanisms are in the same device and the device has immediate knowledge about the availability of the channel(s).

The FIG. 4 device provides a centralized transmission/reception system that enables transparent multi-band flow control decisions and reordering. For example, an optional aspect provides lossless data flow transmissions between bands. Another optional aspect allows the system to adopt to varying throughput and latency on each band air interface without the need for specific calculations. The device is also very reactive and is capable of transmitting on any air interface any time the channel is free. Another exemplary advantage is that this configuration is particularly useful in the unlicensed spectrum where contention for the channel should be taken into account and can often times be difficult to predict.

As discussed, the device in FIG. 4 can provide an architecture at the transmitter and at the receiver for a multi-band architecture with a centralized multi-band upper-MAC entity and multiple lower MAC entities (for example one per band) to enable flow control decisions to be made at the transmission side as well as the reception side.

According to one aspect, a description of the split functions between the centralized multi-band upper MAC and the band/air-interface-specific lower MAC will be described in relation to FIG. 4.

On the transmitter side, the multi-band centralized upper MAC handles the following functions:

1. Present a single MAC SAP to the upper layers (multi-band aggregation is transparent to the upper layers)
2. When receiving packets from the upper layers, performing transmission processing including: A-MSDU aggregation, (multi-band) sequence number assignments, integrity/protection, fragmentation, packet number assignments and media access control protocol data unit (MPDU) encryption as illustrated in FIG. 4. An MPDU can be a message shared amongst MACs based on the OSI model. Optionally, where an MPDU may be larger than the MAC service data unit (MSDU), the MPDU may include multiple MSDUs as a result of packet aggregation. In systems where the MPDU is smaller than the MSDU, then one MSDU may generate multiple MPDUs as a result of packet segmentation.
3. Store the packets in a multi-band common transmission shared buffer 450, optionally per access category.

The multi-band upper MAC 420 includes the traffic routing/steering engine 480 which is adapted to distribute the MSDUs to one or multiple low MAC air interfaces 472/474 and 470/475.

The band/air-interface-specific lower MACs can have a dedicated enhanced distributed channel access function (EDCAF) which is adapted to manage the channel access on the device in the specific band that the lower MACs operate on, following, for example, IEEE 802.11 EDCA rules. Once the channel is acquired, the per-band EDCA function can inform the centralized upper MAC traffic steering function in order to obtain MSDUs from the multi-band common shared buffers.

Once the MSDUs are transmitted to the low MAC of the specific air-interface/band, the following functions can be performed: MDPU header/CRC (cyclic redundancy check) computation, A-MPDU aggregation and transmission.

Once a successful acknowledgement (ACK) is received at the transmission side, the centralized upper MAC can handle the MSDU release function of the transmission multi-band common shared buffer.

On the receiver side, the low MAC specific to a band/air-interface handles: A-MPDU de-aggregation, MPDU header/CRC validation, MPDU decryption and transferring of the packets to the multi-band upper MAC in shared reception buffers.

When there is a successful MPDU/MSDU reception, the multi-band device will send a successful acknowledgement.

The multi-band upper MAC is adapted to perform any one or more of the following functions:

reordering with the shared reordering buffer 455, performing block ACK generation and queuing for transmission in different air interfaces, transmitting directly the ACKs/Block Acknowledgements (BAs) in a response time (for example during the immediate response SIFS (Short Interframe Space) after the end of the reception) to the PPDU transmission on the same air interface, delaying and transmitting the ACKs/BAs on another air interface, performing de-fragmentation, performing integrity/protection, and/or performing A-MSDU de-aggregation.

The multi-band control 440 is adapted to manage one or more of security keys, sequence counters and packet counters.

An illustrative operational description of the device will be provided in conjunction with FIGS. 3-4. STA1 310 starts by establishing multi-band link aggregation with STA2 320 over the 5 GHz and 60 GHz links (of course other links at other frequencies are possible). Hypothetically, STA1 is capable of transmission and reception at 5 GHz and 60 GHz. STA2 320 can receive, but not transmit at 60 GHz (for example, if STA1 has a large antenna array and STA2 320 has a small antenna array, and the link is closed from STA1 to STA2 320, but not from STA2 230 to STA1 310).

Packets then arrive in the STA1 MAC SAP. In the STA1 310 upper MAC, packets are assigned multi-band sequence numbers 1-20, and are placed in the multi-band shared queue for transmission. This queue can optionally be treated as a "best effort" queue. STA1's 5 GHz low MAC and 60 GHz low MAC then contend for channel access using, for example, the EDCA function.

Assume that the 5 GHz low MAC accesses the channel first, and signals this information regarding the channel access to the multi-band upper MAC. Packets 1-10 are routed/steered to the 5 GHz low MAC for transmission.

Say, packets 1-10 are transmitted, and packets 1-8 are successfully received at STA2 320, which sends BAs directly back to STA1.

At STA1 310, the 5 GHz low MAC which receives the BAs, forwards the same or an indication thereof to the multi-band upper MAC. Packets 1-8 can be one or more of deleted/supressed/marked as inactive or complete from the multi-band shared buffers in STA1's upper MAC.

STA1's 60 GHz low MAC addresses the channel, signals information regarding this access to the multi-band upper MAC, which routes/steers packets 9-20 to the 60 GHz low MAC for transmission.

Packets 9-20 are transmitted on the 60 GHz air interface, with packets 9-20 being successfully received at STA2 320. STA2 320 does not have an uplink available at 60 GHz and applies a delayed BA. The BA packet is then routed to STA2's 5 GHz low MAC for transmission to STA1 310.

The BA is transmitted on the 5 GHz air interface from STA2 320 to STA1 310, which receives the BA and forwards the same to STA1's upper MAC. Packets 9-20 can now be deleted/supressed/marked as inactive or complete from the multi-band shared buffers in the upper MAC.

While the above provides just one simple example of the device's operation, it is to be appreciated that numerous variations and permutations are possible including not only the dual-band operation described, but also extending the technology discussed herein to tri-band devices and beyond. Moreover, the technology is not limited to 2.4 GHz, 5 GHz and 60 GHz channels, but is generally applicable to any frequency range(s)/channel(s). Moreover, and as discussed, the technology may be particularly useful in the unlicensed spectrum.

Figure 5:
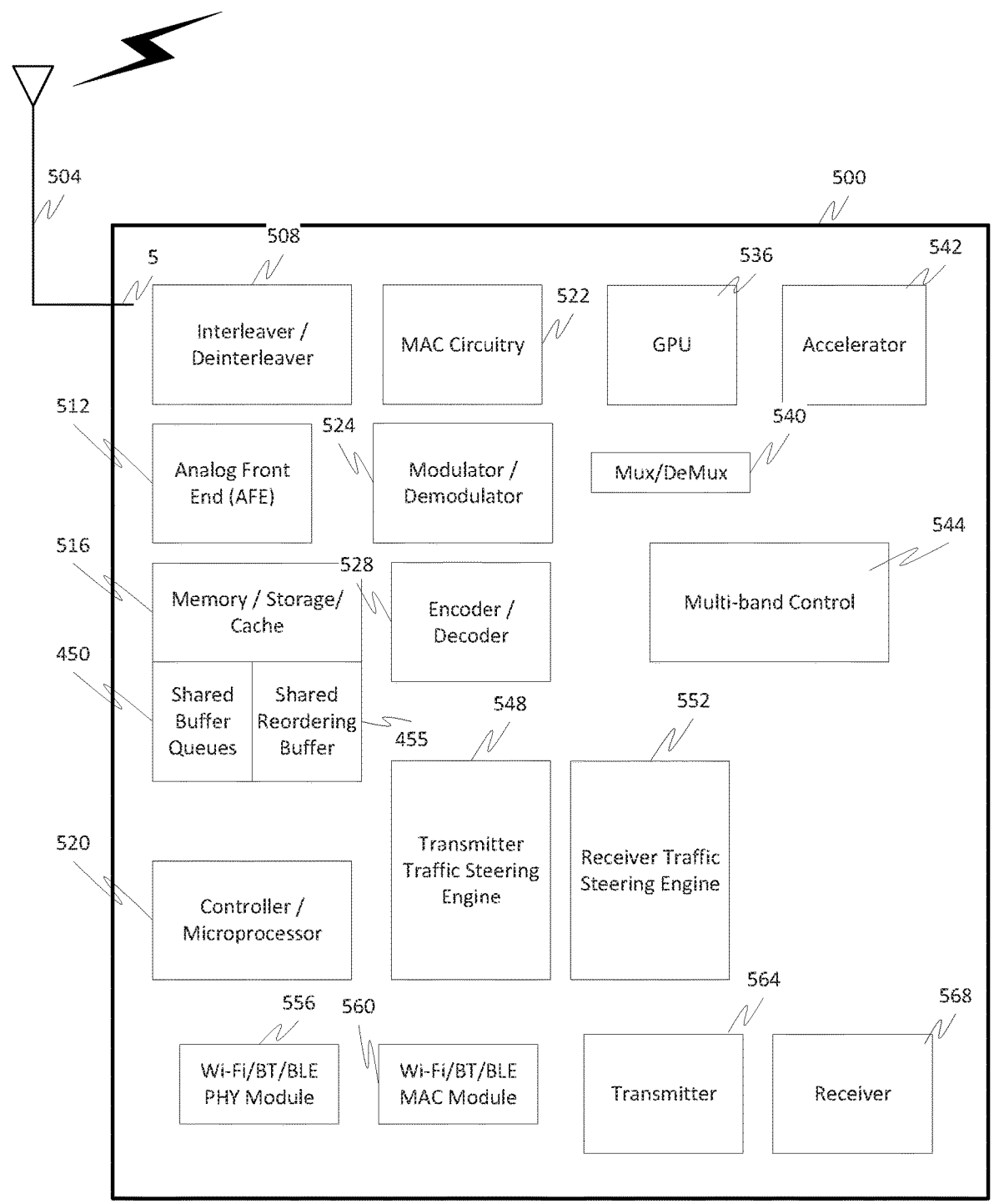
FIG. 5 illustrates an exemplary communications device.

FIG. 5 illustrates an exemplary hardware diagram of a device 500, such as a wireless device, mobile device, access point, station, and/or the like, that is adapted to implement the technique(s) discussed herein. Operation will be discussed in relation to the components in FIG. 5 appreciating that each separate device in a system, e.g., station, AP, proxy server, etc., can include one or more of the components shown in the figure, with the components each being optional. Each of the components in FIG. 5 can optionally be merged with one or more of the other components described herein, or into a new component(s). Additionally, it is to be appreciated that some of the components may have partially overlapping functionality. Similarly, all or a portion of the functionality of a component can optionally be merged with one or more of the other components described herein, or into a new component(s).

In addition to well-known componentry (which has been omitted for clarity), the device 500 includes interconnected elements (with links 5 generally omitted for clarity) including one or more of: one or more antennas 504, an interleaver/deinterleaver 508, an analog front end (AFE) 512, memory/storage/cache 516 and buffers 450/455, controller/microprocessor 520, MAC circuitry 522, modulator/demodulator 524, encoder/decoder 528, GPU 536, accelerator 542, a multiplexer/demultiplexer 540, multi-band controller 544, transmitter traffic steering/routing engine 480/548, receiver traffic routing/steering engine 485/552, a Wi-Fi/BT/BLE (Bluetooth®/Bluetooth® Low Energy) PHY module 556, a Wi-Fi/BT/BLE MAC module 560, transmitter 564 and receiver 568. The various elements in the device 500 are connected by one or more links (not shown, again for sake of clarity).

The device 500 can have one more antennas 504, for use in wireless communications such as multi-input multi-output (MIMO) communications, multi-user multi-input multi-output (MU-MIMO) communications Bluetooth®, LTE, RFID, 4G, LTE, etc. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The device 500 can also include a controller/microprocessor 520 and a memory/storage/cache 516. The device 500 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the device 500. Furthermore, the controller/microprocessor 520 can perform operations for configuring and transmitting information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The device 500 can further include a transmitter 564 and receiver 568 which can transmit and receive signals, respectively, to and from other wireless devices and/or access points using the one or more antennas 504. Included in the device 500 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wireless medium as discussed.

The PHY module/circuitry 556 controls the electrical and physical specifications for device 500. In particular, PHY module/circuitry 556 manages the relationship between the device 500 and a transmission medium. Primary functions and services performed by the physical layer, and in particular the PHY module/circuitry 556, include the establishment and termination of a connection to a communications medium, and participation in the various process and technologies where communication resources shared between, for example, among multiple STAs. These technologies further include, for example, contention resolution and flow control and modulation or conversion between a representation digital data in user equipment and the corresponding signals transmitted over the communications channel. These are signals are transmitted over the physical cabling (such as copper and optical fiber) and/or over a radio communications (wireless) link. The physical layer of the OSI model and the PHY module/circuitry 556 can be embodied as a plurality of sub components. These sub components or circuits can include a Physical Layer Convergence Procedure (PLCP) which acts as an adaption layer. The PLCP is at least responsible for the Clear Channel Assessment (CCA) and building packets for different physical layer technologies. The Physical Medium Dependent (PMD) layer specifies modulation and coding techniques used by the device and a PHY management layer manages channel tuning and the like. A station management sub layer and the MAC circuitry 522 handle co-ordination of interactions between the MAC and PHY layers.

The MAC layer and components, and in particular the MAC module 560 and MAC circuitry 522 provide functional and procedural means to transfer data between network entities and to detect and possibly correct errors that may occur in the physical layer. The MAC module 350 and MAC circuitry 522 also provide access to contention-based and contention-free traffic on different types of physical layers, such as when multiple communications technologies are incorporated into the device 500. In the MAC layer, the responsibilities are divided into the MAC sub-layer and the MAC management sub-layer. The MAC sub-layer defines access mechanisms and packet formats while the MAC management sub-layer defines power management, security and roaming services, etc.

The device 500 can also optionally contain a security module (not shown). This security module can contain information regarding but not limited to, security parameters required to connect the device to an access point or other device or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with the access point and/or another device. The information exchange can occur through encoded messages with the WEP access code often being chosen by the network administrator. WPA is an added security standard that is also used in conjunction with network connectivity with stronger encryption than WEP.

The accelerator 542 can cooperate with MAC circuitry 522 to, for example, perform real-time MAC functions. The GPU 536 can be a specialized electronic circuit designed to rapidly manipulate and alter memory to accelerate the creation of data such as images in a frame buffer. GPUs are typically used in embedded systems, mobile phones, personal computers, workstations, and game consoles. GPUs are very efficient at manipulating computer graphics and image processing, and their highly parallel structure makes them more efficient than general-purpose CPUs for algorithms where the processing of large blocks of data is done in parallel.

The various elements/components in FIG. 5 cooperate to perform the functionality as discussed herein and in particular the functionality discussed in relation to FIGS. 3-4.

Figure 6:
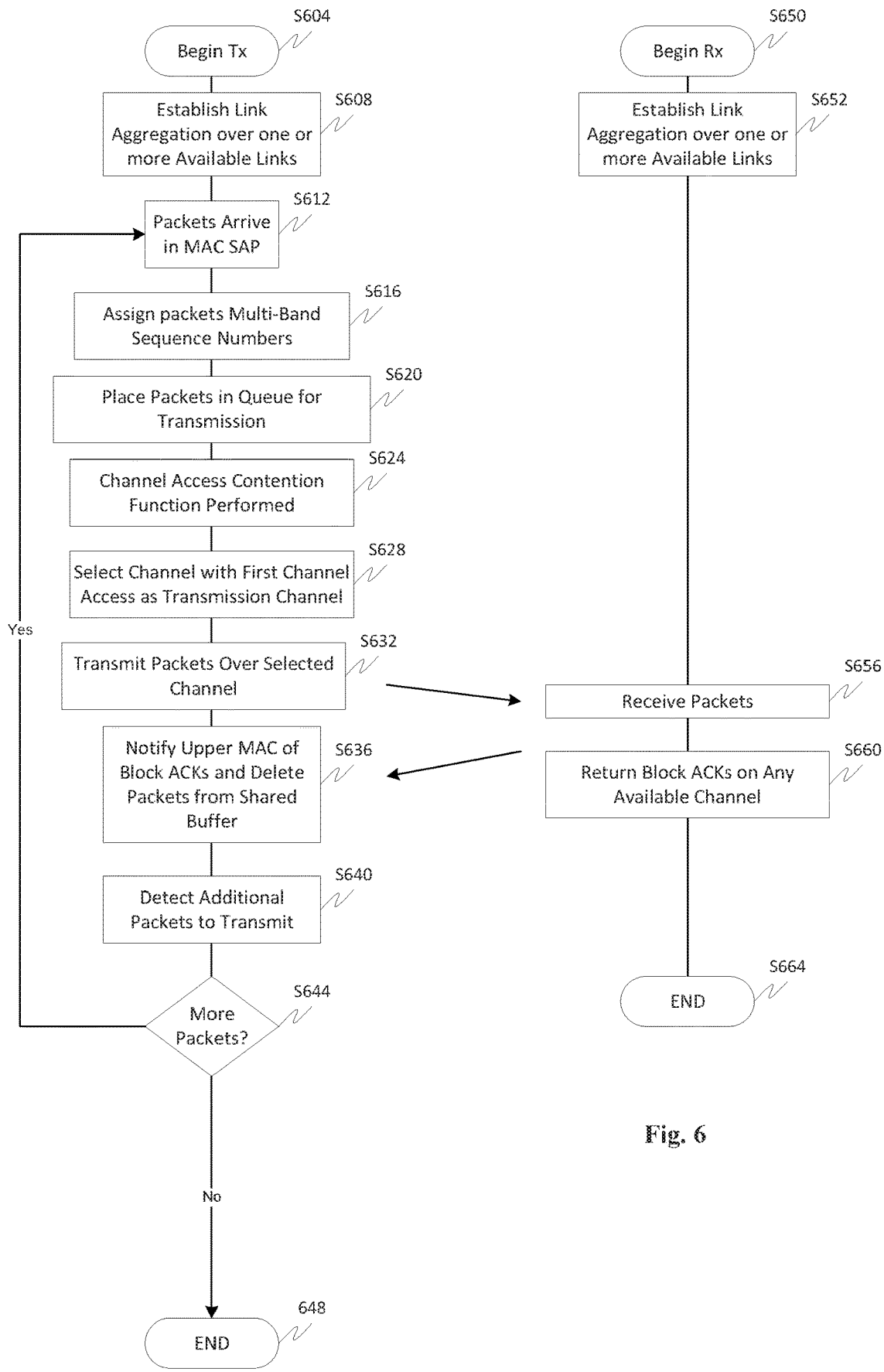
FIG. 6 is a flowchart illustrating an exemplary method for traffic steering/routing in a multi-band aggregated environment.

FIG. 6 outlines an exemplary method of operation for traffic steering in a multi-band aggregated communications environment. Control for the transmitter begins in step S604 and continues to step S608. For the receiver, control begins in step S650 and continues to step S652.

In steps S608/S652, the transmitter/receiver establish link aggregation. Next, in step S612, the transmitter receives packets in the MAC SAP. Then, in step S616, the packets are assigned multi-band sequence numbers and in step S620 placed in a queue for transmission. Control then continues to step S624.

In step S624, the transmitter contends for channel access on any of the available channels and in step S628 selects the first available channel. As will be appreciated however, other criteria can be employed such that not always is the first available channel selected. For example, depending on latency requirements, QoS requirements, bandwidth requirements, or in general any requirement, a first available channel and/or a first available channel that meets one or more requirements can be selected.

Next, in step S632, the packets are transmitted over the selected channel to the receiver. The receiver in step S656 receives one or more of the transmitted packets and confirms receipt of the one or more transmitted packets in step S660 by returning a block ACK(s) on any available channel. For example, and as discussed, the packets could have been transmitted on a first channel and the block ACKs retuned on a second, different, channel.

In step S636, the upper MAC of the transmitter is notified of the received block ACK(s) and the packets that were confirmed as received deleted from the shared buffer (with packets that were not confirmed as received optionally left in the buffer for later retransmission). Next, in step S640 one or more additional packets for transmission are detected, with in step S644 control jumping back to step S612 when there are additional packets to transmit with control otherwise continuing to step S648 where the control sequence ends.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced GFDM communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:

A multi-band wireless communications device comprising:
   a multi-band upper Media Access Controller (MAC) portion including:
     a multi-band transmitter; and
     a multi-band receiver; and
   a transmitter traffic steering engine; and
   a plurality of lower MAC portions each including:
     a Media Access Controller (MAC) transmitter, a Media Access Controller (MAC) receiver, and a Physical Layer (PHY) air interface, the transmitter traffic steering engine routing packets from a shared buffer queue to one or more of the lower MAC portions associated with a channel at least based on channel availability.

Any of the above aspects, further comprising a receiver traffic steering engine in communication with a block acknowledgement service.

Any of the above aspects, wherein the receiver traffic steering engine and the transmitter traffic steering engine are in a lower MAC layer.

Any of the above aspects, wherein each of the Media Access Controller (MAC) receivers are in operational communication with a shared reordering buffer.

Any of the above aspects, further comprising a multi-band controller operational to control one or more functions of the multi-band transmitter and/or the multi-band receiver.

Any of the above aspects, wherein the multi-band upper MAC communicates with an upper layer with a single MAC SAP ((Service Access Point).

Any of the above aspects, wherein the multi-band wireless communications device is an access point, a portable wireless device or a station.

Any of the above aspects, wherein block acknowledgements can be transmitted by any MAC transmitter regardless of the channel packets are received on.

Any of the above aspects, wherein the transmitter traffic steering engine distributes MSDUs (MAC Service Data Units) to one or more MAC transmitters and the receiver traffic steering engine collects MPDUs (MAC Protocol Data Units) from different MAC receivers.

Any of the above aspects, wherein each of the plurality of lower MAC portions further include an Enhanced Distributed Channel Access functional block for managing channel access.

A non-transitory information storage media having stored thereon one or more instructions, that when executed by one or more processors, cause a multi-band wireless communications device to perform a method comprising:

routing packets from a shared buffer queue to one or more of a plurality of lower MAC portions each associated with a channel at least based on channel availability, wherein each of a plurality of lower MAC portions each include a Media Access Controller (MAC) transmitter, a Media Access Controller (MAC) receiver, and a Physical Layer (PHY) air interface.

Any of the above aspects, further comprising managing communications between a receiver traffic steering engine and a block acknowledgement service.

Any of the above aspects, wherein the receiver traffic steering engine and the transmitter traffic steering engine are in a lower MAC layer.

Any of the above aspects, wherein each of the Media Access Controller (MAC) receivers are in operational communication with a shared reordering buffer.

Any of the above aspects, further comprising controlling one or more functions of a multi-band transmitter and/or a multi-band receiver.

Any of the above aspects, further comprising managing communications between a multi-band upper MAC and an upper layer with a single MAC SAP ((Service Access Point).

Any of the above aspects, wherein the wireless device is an access point or a station.

Any of the above aspects, further comprising transmitting block acknowledgements by any MAC transmitter regardless of the channel packets are received on.

Any of the above aspects, further comprising: distributing MSDUs (MAC Service Data Units) to one or more MAC transmitters; collecting MPDUs (MAC Protocol Data Units) from different MAC receivers; and managing channel access.

A multi-band wireless communications device comprising:

means for routing packets from a shared buffer queue to one or more of a plurality of lower MAC portions each associated with a respective channel at least based on channel availability, wherein each of a plurality of lower MAC portions each include a Media Access Controller (MAC) transmitter, a Media Access Controller (MAC) receiver, and a Physical Layer (PHY) air interface; and means for routing received packets to a shared reordering buffer.

Any of the above aspects, further comprising a receiver traffic steering engine in communication with a block acknowledgement service.

Any of the above aspects, wherein the receiver traffic steering engine and the transmitter traffic steering engine are in a lower MAC layer.

Any of the above aspects, wherein each of the Media Access Controller (MAC) receivers are in operational communication with a shared reordering buffer.

Any of the above aspects, further comprising a multi-band controller operational to control one or more functions of the multi-band transmitter and/or the multi-band receiver.

Any of the above aspects, wherein the multi-band upper MAC communicates with an upper layer with a single MAC SAP ((Service Access Point).

Any of the above aspects, wherein the multi-band wireless communications device is an access point, a portable wireless device or a station.

Any of the above aspects, wherein block acknowledgements can be transmitted by any MAC transmitter regardless of the channel packets are received on.

Any of the above aspects, wherein the transmitter traffic steering engine distributes MSDUs (MAC Service Data Units) to one or more MAC transmitters and the receiver traffic steering engine collects MPDUs (MAC Protocol Data Units) from different MAC receivers.

Any of the above aspects, wherein each of the plurality of lower MAC portions further include an Enhanced Distributed Channel Access functional block for managing channel access.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element.

The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A multi-band wireless communications device comprising:
a multi-band upper Media Access Controller (MAC) portion including:
a multi-band transmitter; and
a multi-band receiver; and
a transmitter traffic steering engine; and
a plurality of lower MAC portions each including:
a Media Access Controller (MAC) transmitter, a Media Access Controller (MAC) receiver, and a Physical Layer (PHY) air interface, the transmitter traffic steering engine routing packets from a shared buffer queue to one or more of the lower MAC portions associated with a channel at least based on channel availability, wherein the shared buffer queue is within the multi-band upper Media Access Controller (MAC) portion and operationally connected to each Media Access Controller (MAC) transmitter.

2. The device of claim 1, further comprising a receiver traffic steering engine in communication with a block acknowledgement service.

3. The device of claim 2, wherein the receiver traffic steering engine and the transmitter traffic steering engine are in a lower MAC layer.

4. The device of claim 1, wherein each of the Media Access Controller (MAC) receivers are in operational communication with a shared reordering buffer.

5. The device of claim 1, further comprising a multi-band controller operational to control one or more functions of the multi-band transmitter and/or the multi-band receiver.

6. The device of claim 1, wherein the multi-band upper MAC communicates with an upper layer with a single MAC SAP ((Service Access Point).

7. The device of claim 1, wherein the multi-band wireless communications device is an access point, a portable wireless device or a station.

8. The device of claim 1, wherein block acknowledgements can be transmitted by any MAC transmitter regardless of the channel packets are received on.

9. The device of claim 1, wherein the transmitter traffic steering engine distributes MSDUs (MAC Service Data Units) to one or more MAC transmitters and the receiver traffic steering engine collects MPDUs (MAC Protocol Data Units) from different MAC receivers.

10. The device of claim 1, wherein each of the plurality of lower MAC portions further include an Enhanced Distributed Channel Access functional block for managing channel access.

11. A non-transitory information storage media having stored thereon one or more instructions, that when executed by one or more processors, cause a multi-band wireless communications device to perform a method comprising:
routing packets from a shared buffer queue, wherein the shared buffer queue is within a multi-band upper Media Access Controller (MAC) portion and operationally connected to each Media Access Controller (MAC) transmitter, to one or more of a plurality of lower MAC portions each associated with a channel at least based on channel availability, wherein each of a plurality of lower MAC portions each include a Media Access Controller (MAC) transmitter, a Media Access Controller (MAC) receiver, and a Physical Layer (PHY) air interface.

12. The media of claim 11, further comprising managing communications between a receiver traffic steering engine and a block acknowledgement service.

13. The media of claim 12, wherein the receiver traffic steering engine and the transmitter traffic steering engine are in a lower MAC layer.

14. The media of claim 11, wherein each of the Media Access Controller (MAC) receivers are in operational communication with a shared reordering buffer.

15. The media of claim 11, further comprising controlling one or more functions of a multi-band transmitter and/or a multi-band receiver.

16. The media of claim 11, further comprising managing communications between a multi-band upper MAC and an upper layer with a single MAC SAP ((Service Access Point).

17. The media of claim 11, wherein the wireless device is an access point or a station.

18. The media of claim 11, further comprising transmitting block acknowledgements by any MAC transmitter regardless of the channel packets are received on.

19. The media of claim 11, further comprising:
distributing MSDUs (MAC Service Data Units) to one or more MAC transmitters;
collecting MPDUs (MAC Protocol Data Units) from different MAC receivers; and
managing channel access.

20. A multi-band wireless communications device comprising:
means for routing packets from a shared buffer queue, wherein the shared buffer queue is within a multi-band upper Media Access Controller (MAC) portion and operationally connected to each Media Access Controller (MAC) transmitter, to one or more of a plurality of lower MAC portions each associated with a respective channel at least based on channel availability, wherein each of a plurality of lower MAC portions each include a Media Access Controller (MAC) transmitter, a Media Access Controller (MAC) receiver, and a Physical Layer (PHY) air interface; and
means for routing received packets to a shared reordering buffer.

* * * * *